INVENTOR.
Paul S. Endacott

July 21, 1936.  P. S. ENDACOTT  2,047,953
CUSTOMER'S LIQUEFIED PETROLEUM GAS TRANSPORTATION,
STORAGE, AND UTILIZATION EQUIPMENT
Filed July 16, 1934     5 Sheets-Sheet 2
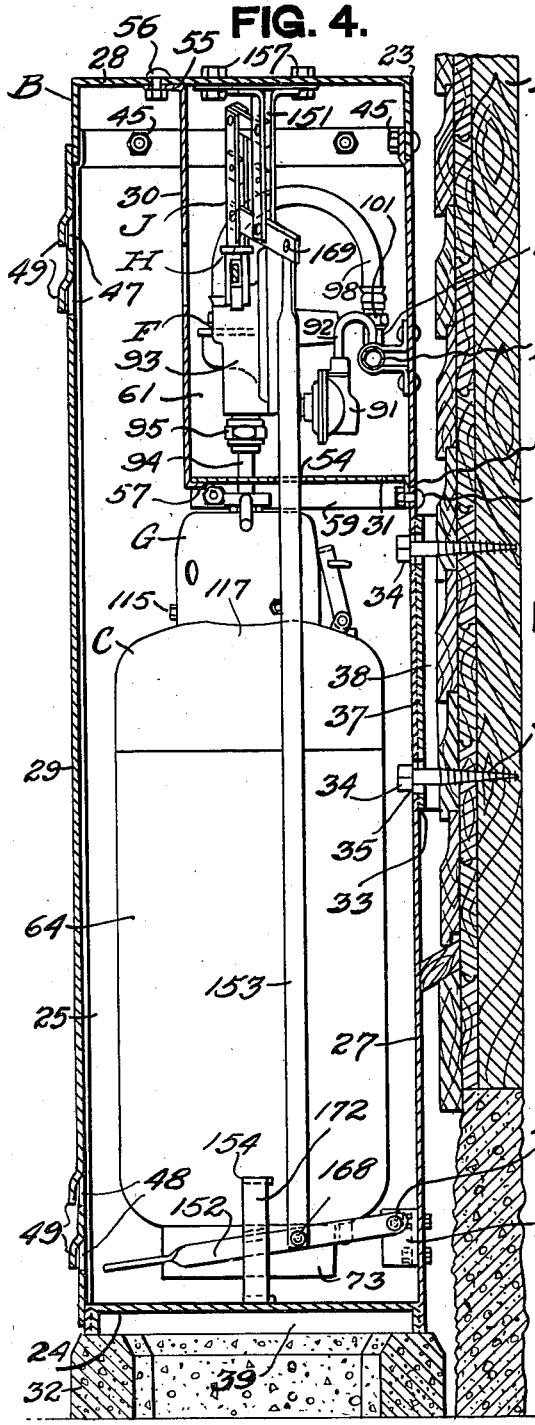
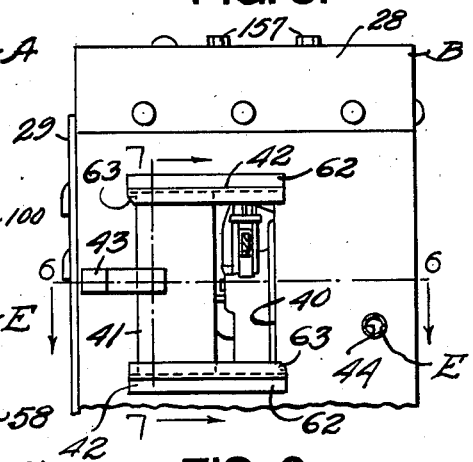
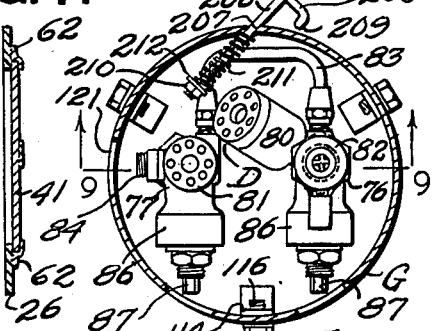
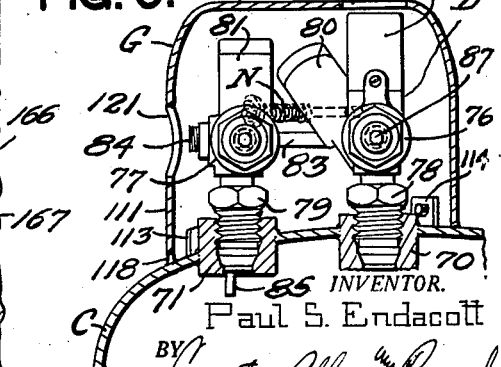
INVENTOR.
Paul S. Endacott
BY
ATTORNEYS.

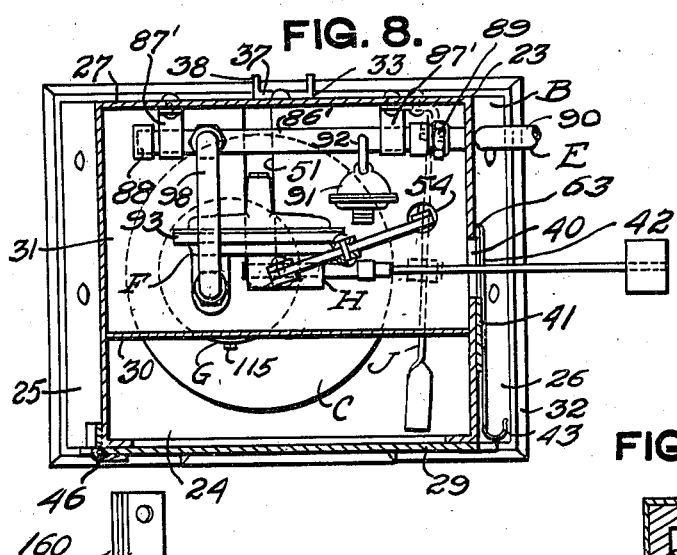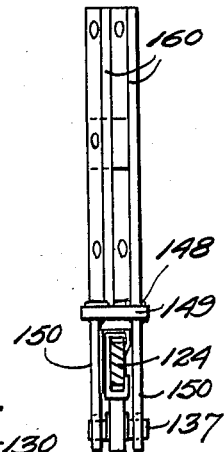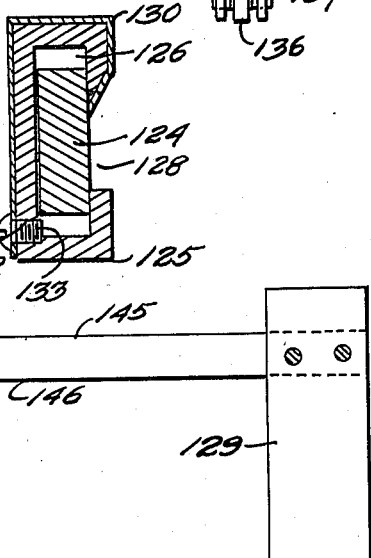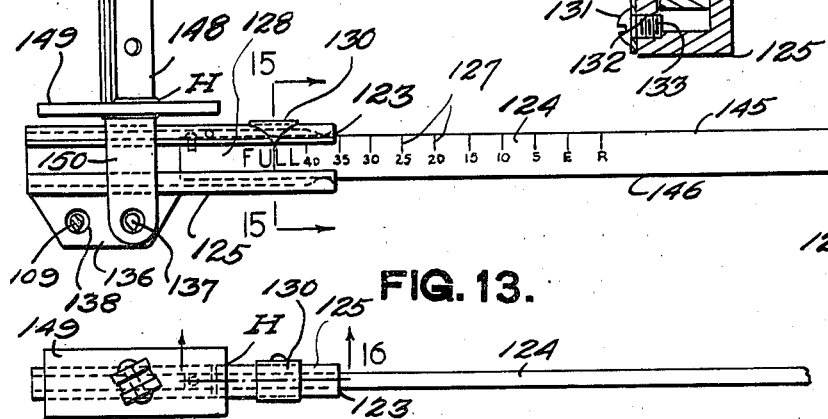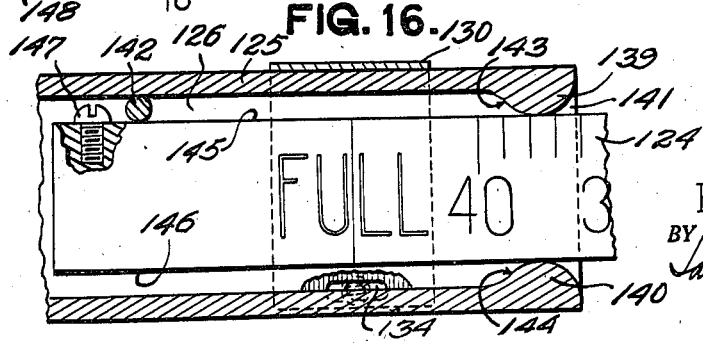

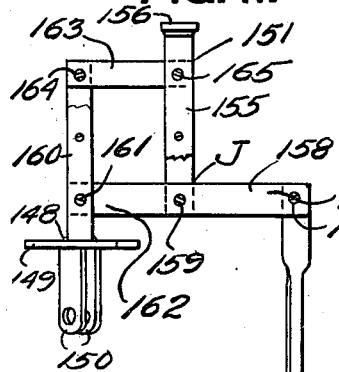

July 21, 1936.  P. S. ENDACOTT  2,047,953
CUSTOMER'S LIQUEFIED PETROLEUM GAS TRANSPORTATION,
STORAGE, AND UTILIZATION EQUIPMENT
Filed July 16, 1934   5 Sheets-Sheet 5

INVENTOR.
Paul S. Endacott
BY
Lancaster, Allwine and Rommel
ATTORNEYS.

Patented July 21, 1936

2,047,953

UNITED STATES PATENT OFFICE 2,047,953

CUSTOMER'S LIQUEFIED PETROLEUM GAS TRANSPORTATION, STORAGE, AND UTILIZATION EQUIPMENT

Paul S. Endacott, Bartlesville, Okla., assignor to Phillips Petroleum Company, Bartlesville, Okla., a corporation of Delaware Application July 16, 1934, Serial No. 735,541

11 Claims. (Cl. 221—73.5)

This invention relates to equipment for the transportation, storage and utilization of liquefied petroleum gas, and more particularly to equipment well adapted for use by the consumer of propane and similar petroleum products used for heating, lighting and cooking purposes in and about the home, store, factory, etc.

The present invention embodies improvements in and additions to the equipment shown in Patents 1,976,719 and 1,977,268, granted October 16, 1934; 1,994,337 and 1,994,338 granted March 12, 1935; 2,009,768 granted July 30, 1935 and in copending application for United States patent filed by me May 8, 1933, Serial Number 670,046.

One of the main objects of the present invention is to provide equipment for use by the consumer of liquefied petroleum gas whereby the operations incident to transportation and utilization of the product are simplified, and numerous safeguards against accidents and injury to body and equipment are embodied in the equipment.

Another object of the invention is to provide storage and utilization equipment for liquefied petroleum gas where a single cabinet for each installation compactly houses a tank containing one or more supplies of liquefied gas as well as mechanism for raising the tank off the floor or base of the cabinet; a scale for weighing the tank contents; a pressure reducing regulator for control of the fuel so that it may be changed from a high pressure liquid or vapor phase to a low pressure gaseous phase before leaving the cabinet; and, other devices and accessories incident to or desirable as a part of such equipment. The invention provides a compact arrangement in the cabinet of the tank, means for manually coupling and uncoupling the tank with respect to the pressure reducing regulator so that the hands of the operator may be used in this operation without fatigue, and foot operated mechanism for quickly raising and lowering the scale, regulator and tank simultaneously so that a person may perform these operations while facing the equipment, without expending any great amount of energy, and so that even a comparatively frail person may attend to such transactions as are ordinarily necessary in self-service equipment.

Other objects of the invention are to provide the combination of a tank, a pressure reducing regulator, a scale and load lifting and lowering mechanism which is compact, comprises but few parts, prevents undesirable movement of parts one with respect to another, and permits weighing of the tank contents without shutting off the supply of gas to the gas consuming appliances associated with the equipment; to provide an improved anti-friction telescopic scale beam arrangement; and, to provide an improved mechanism which causes the load to move in a predetermined path while being raised and lowered thereby preventing many destructive forces acting upon bearings of the scale and parts associated with the pressure reducing regulator.

Another object of the invention is to provide an improved control unit including valves and a guard cap associated therewith for a tank partitioned to contain a main or major supply of liquefied gas and a reserve or minor supply of liquefied gas, the assembly being such as to facilitate operation of the valves of the control unit and to discourage tampering with parts of the control units provided to facilitate filling of the tank and to relieve excess pressure in the chambers of the tank.

A further object of the invention is to provide a more compact arrangement of manually operable and automatic valves associated with the tank than is shown in the aforesaid Patent 1,977,268 so that less surface area on the head of the tank need be encompassed by a shield or cap for same and so that they may be offset as a mass considerably more to one side of the axis of the tank than to the other side of said axis whereby to provide ample hand room for the manipulation of a wrench or other device closely adjacent and above the tank for connection of the tank to the pressure reducing regulator. This is of importance, keeping in mind that it is desirable to provide a cabinet for the tank and parts of the equipment the compass of which is kept as small as possible for economy in the use of materials and to avoid the provision of cumbersome and unsightly equipment at or near the house in which the gas consuming appliances are installed.

Another object of the invention is to provide a cabinet for the tank and equipment for weighing and conditioning the contents of the tank for use in gas consuming appliances, which is strong and sturdy, of pleasing appearance, and which has plates or screen walls serving the dual function of strengthening the side and back walls of the carbinet and discouraging tampering with parts which ordinarily require no attention on the part of the consumer.

A still further object of the invention is to provide improved equipment for detachably connecting the tank to the running board or similar portion of an automobile so that an empty or partially empty tank may be returned to the service station and a filled tank may be transported with comparative safety from a service station to the location where the liquefied gas is to be used.

Other objects and advantages of the invention will appear in the following detailed description, taken in connection with the accompanying drawings, forming a part of this specification and in which drawings:—

Figure 4 is a vertical sectional view on substantially the line 4—4 of Figure 1.

Figure 5 is a fragmentary side elevation of the upper portion of the cabinet, provided with an opening for a scale beam.

Figures 6 and 7 are sectional views on the lines 6—6 and 7—7, respectively, of Figure 5.

Figure 1:
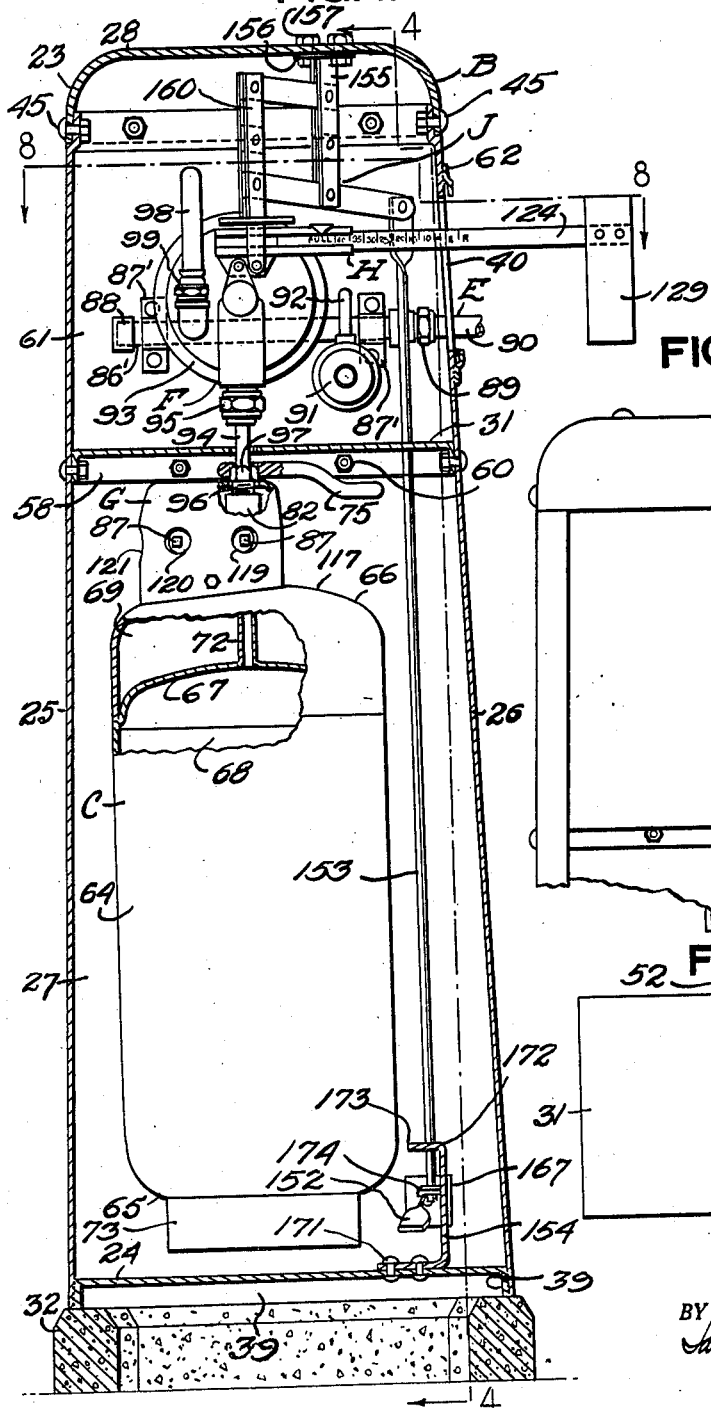
Figure 1 is a view partly in vertical section and partly in elevation, with parts broken away to disclose details, showing consumers' liquefied petroleum gas storage and utilization equipment constructed according to the present invention.

Figure 8 is a horizontal sectional view on the line 8—8 of Figure 1.

Figure 9 is a vertical sectional view on the line 9—9 of Figure 10.

Figure 10 is a plan view of the control assembly shown in Figure 9, with the cap shown in horizontal section.

Figure 11 is a detailed view in elevation of means for raising and lowering the tank and associated parts.

Figure 12 is an enlarged detail view in elevation of a scale forming a part of the equipment.

Figure 13 is a plan view of parts shown in Figure 12.

Figure 14 is an end elevation of the scale, a portion of the beam being shown in section to disclose details.

Figure 15 is an enlarged detailed sectional view on the line 15—15 of Figure 12.

Figure 16 is an enlarged vertical sectional view on the line 16—16 of Figure 13.

Figure 17 is a side elevation of a pressure reducing regulator, a portion thereof being broken away and shown in section to disclose the association of the regulator with the scale.

Figure 18:
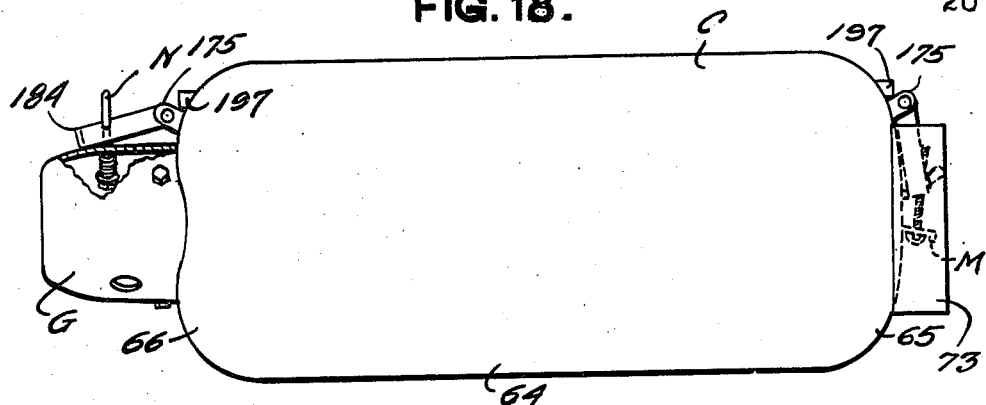

Figure 18 is a view in elevation of a tank equipped with means for fastening same to the running board of an automobile.

Figure 19:
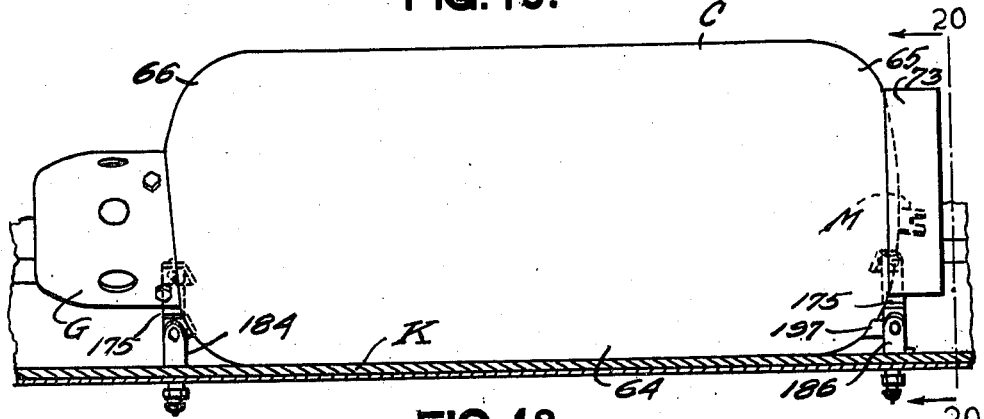

Figure 19 is a similar view showing the tank secured to the running board.

Figure 20 is an enlarged sectional view on the line 20—20 of Figure 19.

Figure 21:
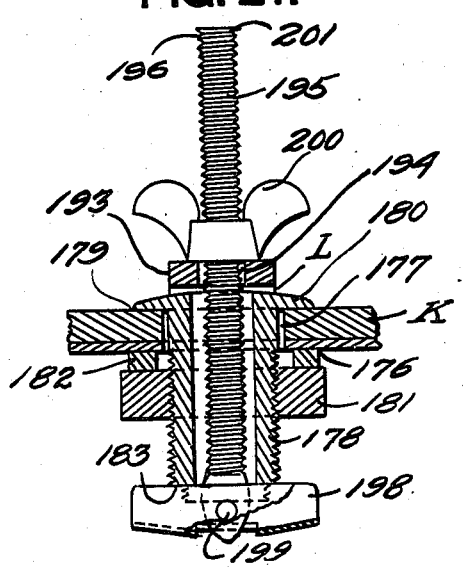

Figure 21 is a view in vertical section through a toggle bolt and associated parts used in fastening the tank to the running board.

Figure 22:
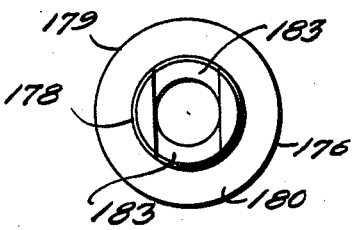

Figure 22 is a bottom plan view of an eyelet forming a part of the running board equipment.

In the drawings, where like reference characters designate like or corresponding parts throughout the views, A is a rigid support, such as the wall of a building; B a cabinet which may be secured to support A; C a tank for high pressure liquefied petroleum gas, such as propane; D means for controlling the passage of liquid, vapor or gas from the tank C; E a consumer's conduit line for low pressure gas which may lead to any suitable gas consuming appliances, not shown in the drawings; F means for conducting fuel from tank C to line E at a reduced low pressure as compared with the vapor pressure in the tank; G a guard or cap for means D; H a scale; J means for raising and lowering the tank C, means D and F, and scale E; K a vehicle part such as the running board thereof; L fastening devices for detachably securing the tank C to the vehicle body A; and M and N means for holding the parts of fastening devices L in snug relation to the tank when not in use.

Referring first to the cabinet B, it comprises a body 23 including a bottom wall 24, side walls 25 and 26, a rear wall 27 and a top wall or cap 28; a door 29 for closing the open front of the body 23; a vertical screen wall or plate 30; and a horizontal screen wall or plate 31. The cabinet is elongated in shape and placed in an upright position. It is preferably of substantially truncated pyramidal shape, and may rest upon a base 32 of concrete or other suitable material. It is also preferred to strengthen the rear wall by a rolled metal section 33 such as a channel which serves to space the cabinet from the surface of support A, such as the outside wall of a building, to which the cabinet is secured as by lag screws 34, the heads 35 of which are on the inside of the cabinet and the shanks 36 of which pass through openings in the rear wall 27 and web 37 of section 33. The web 37 may be welded or otherwise secured to rear wall 27 and the flanges 38 of section 33 project outwardly from the rear wall for engagement with the support A, as shown in Figure 4.

Figure 2:
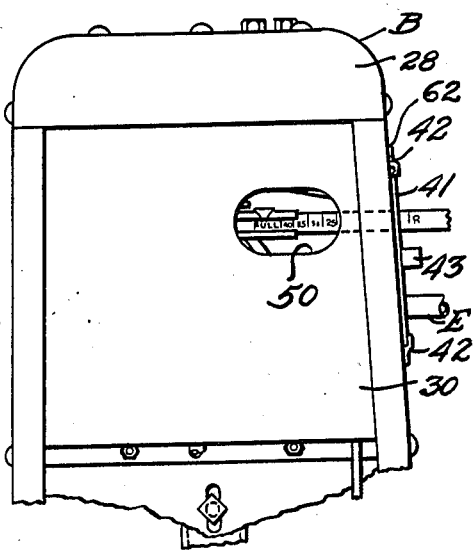
Figure 2 is a fragmentary view in elevation of the upper portion of the cabinet and some of the parts carried thereby.
Figure 3:
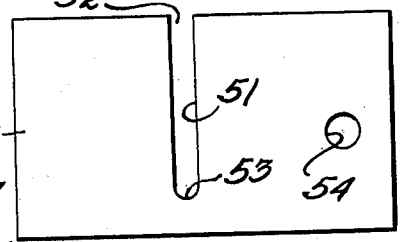
Figure 3 is a plan view of a screen wall or plate which when in place serves to brace the side and rear walls of the cabinet, prevents tampering with parts in the upper portion of the cabinet and limits swinging movement of the tank.

The bottom wall 24 may be provided with downturned flanges 39, welded or otherwise secured to the walls 25, 26 and 27. The side wall 26 is provided with a scale beam opening 40 near its upper margin, which may be closed by a shutter 41 slidable in horizontal guides 42, the shutter being provided with a handle 43. Each side wall may also be provided with an opening 44 through either of which the consumer's conduit line E may pass. The openings 44 are located near the rear margins of the walls. While the top wall or cap 28 may be integral with the side and rear walls, it is preferred to make it a separate piece which may be secured to these walls by suitable fasteners 45, such as nuts and bolts. Thus the top wall or cap may be a casting or formed of sheet metal rendered sufficiently strong and sturdy so as to permit suspending the tank C, scale H and means F from the top wall or cap as shown in Figures 1 and 4. Door 29 may be hinged as at 46 to wall 25, and may be provided with top and bottom vent openings 47 and 48 with which are associated louvers 49. Adjacent side wall 26, the screen wall or plate 30 is provided with a sight opening 50 through which portions of the scale H may be viewed, as shown in Figure 2. Screen wall or plate 31 is provided with a slot 51 elongated in shape with its axis transversely of the plate, open to the rear margin thereof as at 52 and closed as at 53 adjacent the forward margin of the plate. Adjacent one end of the plate a perforation 54 is provided to accommodate one of the parts of means J. These screen walls or plates 30 and 31 may be secured to the cabinet body in any suitable manner. In the example shown wall 30 is provided with a horizontal flange 55 at its upper portion, secured to top wall or cap 28 as by fasteners 56 and at its lower margin may be provided with an inturned flange 57 to engage beneath wall 31. The latter is provided with a downturned rear flange 58 and downturned side flanges 59 which may be secured to the rear wall 27, and side walls 25 and 26, by fasteners 60. The fasteners 56 and 60 may be nuts and bolts which permit removal of these screen walls or plates if repairs, replacement of parts or adjustments are necessary. It will be noted that the walls 30 and 31 brace the upper portion of the cabinet by extending from side wall to side wall and being secured to the rear and top walls. They also form with the side walls, rear wall and top wall, a compartment 61 in the upper portion of the cabinet which is open laterally of the cabinet body at the scale beam opening 40. The guides 42 have longitudinal flanges 62, welded or otherwise secured to wall 26 adjacent the upper and lower margins of opening 40. Each guide may be provided with an inturned portion 63 at its end, to limit sliding movement of the shutter 41 when the latter is in either open or closed relation to the opening 40.

The tank C is very much like that disclosed in my aforesaid application, Serial Number 670,046, in that it is elongated in shape and when in use for supply of gas to the consumer's conduit line E, is normally upright. It comprises a cylindrical body portion 64, a bottom wall 65, a top wall 66, and a partition 67 near the top wall providing a major compartment or chamber 68 and a minor compartment or chamber 69 for liquefied petroleum gas. The top wall 66 is provided with collars 70 and 71, welded or otherwise secured to the tank top, and internally screw threaded to receive parts of the control means D. The bore of collar 70 has communication with chamber 68 through pipe 72. A foot ring 73 may be provided on the lower or bottom wall 65, the ring having a slot 74 as shown in Figure 20. Collar 70 and pipe 72 may be co-axial with body portion 64, while collar 71, the bore of which has communication with minor chamber 69, is offset laterally with respect to collar 70, but with the axes of these collars parallel.

In order that either or both chambers 68 and 69 may be selectively drawn upon by the consumer, and the tank relieved of excess pressure, means D is provided. It may comprise the same units disclosed in the aforesaid Patent 1,977,268, which are, however, arranged differently in the present case, so that less surface area on the head of the tank need be encompassed by the shield or cap G and so that they may be offset as a mass considerably more to one side of the axis of the tank than to the other side of said axis, whereby to provide ample hand room for manipulation of a wrench 75, or other suitable device closely adjacent and above the tank, forming a part of the means F, as hereinafter described. Referring more particularly to Figures 9 and 10, means D comprises manually operable valves 76 and 77 mounted upon the tank by couplings 78 and 79 having screw threaded engagement with the collars 70 and 71, respectively; safety valves 80 and 81 carried by valves 76 and 77, respectively; an outlet coupling 82 mounted upon valve 76; a conduit 83 affording communication between the outlets of valves 76 and 77, whereby the outlet coupling 82 serves both valves 76 and 77; and a vent plug 84 closing the opening of a dip tube 85, provided so as to prevent complete filling of the minor chamber or compartment 69. Each of the valves 76 and 77 is provided with a bonnet 86 in which is movable an operating stem 87 and which, in the example shown, may be rotated by use of a suitable wrench, not shown in the drawings. These valves 76 and 77 are mounted next adjacent one another and the tank, with the valve stems horizontal and the bonnets pointing laterally in the same general direction, as shown in Figure 10. The safety valve 80 is carried by valve 76 and extends laterally, diagonally and upwardly therefrom into a space above the plane of conduit 83. The safety valve 81 is mounted vertically upon valve 77. The axis of plug 84 is at a right angle to the axis of stem 87 of valve 77. For details of these various units, reference may be had to the aforesaid Patent 1,977,268. It will be noted, however, that the present arrangement locates the safety valve 80 so that it points in a direction substantially opposite to the direction in which the valve stems 87 point thereby utilizing space above the conduit 83 and, all in all, arranging the units very compactly.

The consumer's conduit line E includes a pipe 86' which may be rigidly secured in the compartment 61 of the cabinet, to the rear wall 27, by brackets 87', which space is a suitable distance from the wall 27 so as to permit placing and removal of a cap 88 which may be placed on either end of the pipe 86', and a union 89 which joins a pipe 90 to the uncapped end of pipe 86'. Pipe 90 leads through the opening 44 in side wall 26 and to the gas consuming appliances not shown in the drawings. An outlet pressure relief valve 91 may be provided in compartment 61, connected to pipe 86' by a goose neck 92.

Fluid from the outlet coupling 82 finds its way to the line E through means F which will now be described. It includes a pressure reducing regulator 93 which, through a pipe 94 coupled to the high pressure inlet of the regulator by union 95, and to the tank C by a coupling 96, companion to outlet coupling 82, forms a suitable suspension device between the scale H and tank C. The coupling 96 includes a wrench head 97 which receives the aforesaid wrench 75. The low pressure outlet of regulator 93 has communication with pipe 86', through flexible conduit 98, it being connected to the regulator by union 99, and to a nipple 100 of pipe 86 by a union 101. The pipe 94 extends through the slot 51 in screen plate 31 near the closed end 53 thereof so that the plate 31 limits outward swinging movement of the tank in the cabinet, by the pipe 94 contacting the plate at the end 53 of the slot. Lateral movement of the tank toward either wall 25 or 26 is likewise limited by contact of pipe 94 with the plate at either side of the slot. Rearward movement of the tank C is limited by contacting the rear wall 27 of the cabinet. The regulator 93 has preferably cast integral with its front cover plate 102, a clevis-like portion 103, including lugs 104 and 105, spaced apart to provide a mouth 106 which opens upwardly to receive a portion of scale H as hereinafter described. Lug 104 is provided with a recess 107 open to mouth 106 and lug 105 has a bore 108 axially aligned with recess 107. The bore 108 and recess 107 receive a pivot pin 109 extending across mouth 106, and held against rotation by a transverse pin 110 carried by lug 105.

To discourage tampering with control means D, a guard or cap G is provided. It preferably comprises an inverted cup-like body including an annular side wall 111 and a top 112, and is held to the dome-shaped top wall 66 of tank C by a plurality of angle clips 113 which may be welded to top 66, with vertical arms 114 adapted to receive bolts 115, the shanks 116 of which extend thru the wall 111 and have screw threaded engagement with the arms 114. The cap G is mounted eccentric to the vertical axis of tank C so as to provide an unobstructed space 117 on the top wall and so as to give ample hand room for manipulation of wrench 75. The lower margin of wall 111 is made to conform to and contact with the dome-shaped top wall 66, except for a drainage opening 118 at that portion remote from the longitudinal axis of the tank which is lowermost and assures complete drainage of liquid which may find its way into the cap or products of condensation in the cap which may flow downwardly onto the tank top. The side wall 111 is provided with openings 119 and 120 at its front through which access may be had to the valve stems 87 of valves 76 and 77, respectively. There is also provided an opening 121 in the side portion of wall 111 through which access may be had to the vent plug 84. The top 112 is provided with an opening 122 through which the coupling 96 may extend in order to connect the tank to means F.

By reference to Figure 1 it may be observed that when the tank C is properly located in the cabinet B, the opening 121 is closest to wall 25 so that a person is not apt to tamper with the vent plug 84, yet the valve stems 87 of the control valves 76 and 77 are readily accessible through openings 119 and 120. In Figure 1, the wrench 75 is closely adjacent the bottom screen plate 31, but the tank is there shown suspended. When it is let down to rest upon the bottom wall 24 of the cabinet there is ample hand room above the area 117 of top wall 66 and below the bottom screen plate 31 for manipulation of the wrench to couple or uncouple a tank with respect to the pressure regulator and associated parts.

The scale H is very much like that disclosed in the aforesaid Patent 2,009,768, in that it includes a scale beam 123 including a stem section 124 and a sleeve-like section 125 embracing section 124, providing a slideway 126 for receiving the stem section, so that the latter may be moved to extend entirely through the sleeve-like section 125 or have merely its inner end portion in the slideway as shown in Figure 12. The stem section is provided with graduations and other indicia 127 thereon, which may be viewed through a slot or sight opening 128 of section 125. It is also provided with a counterweight or poise 129 at its end remote from section 125. An indicator 130 is adjustably carried by section 125 as by set screw 131 having screw threaded engagement in bore 132 in section 125, the shank 133 of the screw extending through an elongated slot 134 in the back plate 135 of the indicator. Sleeve section 125 also has a depending web 136 extending longitudinally of the lower portion thereof provided with suspension pivot 137 and an opening 138 receiving the aforesaid pin 109. The improved scale beam 123 is provided with antifriction bearings 139 and 140 at the mouth 141 of slideway 126 and an anti-friction bearing 142 remote from its mouth for engagement with the edges of stem section 124. The bearings 139 and 140 may be projections cast or formed as a part of the section 124, provided with arcuate faces 143 and 144, respectively, having line contact with the top and bottom edges 145 and 146, respectively, of the stem section. The bearing 142 may be a cylindrical pin rigid with the upper portion of section 125 and extending across the slideway 126 for line contact with the upper edge 145 of stem section 124. In order to limit outward sliding movement of the stem section, it is provided with a stop pin 147 at its end opposite to poise 129 which may engage bearing 142 as is obvious from an insepction of Figure 16. The scale is suspended from a vertical hanger 148 including a horizontal stop bar 149 above the sleeve-like section 125 and depending arms 150 which embrace said section and have pivotal connection with the pivot 137. In Figure 1 the stem section of the scale is shown extending through the opening 40 in wall 26, so as to expose the poise 129 to view exteriorly of the cabinet where it may act as a signal, by moving downwardly as the liquefied petroleum gas in tank C is used and hence the load on the scale becomes lighter in weight. The stop bar 149 limits the amplitude of oscillation of sleeve section 125 on the hanger 148. It is to be noted also that the stem sections may be moved to a position entirely in compartment 61, at which time the shutter 41 may be closed.

In order that the scale, tank and connection between the two may be quickly and conveniently raised and lowered, the means J is provided. It differs from the mechanism shown in the aforesaid Patent 2,009,768, in that the operator is not required to reach into the upper part of the cabinet but may, while facing the screen plate 30, operate the mechanism with the right foot. It preferably comprises a parallelogram mechanism 151, a foot lever 152, a link 153 between the lever 152 and mechanism 151 to operate the latter by movement of the former, and a catch device 154 associated with the lever 152. The mechanism 151 preferably includes spaced vertical arms 155 secured to the cabinet top 28 as by attaching plate 156 and bolts 157, a lever 158 pivoted intermediate its ends as at 159 to the lower end portion of arms 155, spaced vertical arms 160 of hanger 148 pivoted intermediate their ends, as at 161, to one end portion 162 of lever 158, and a link 163 parallel to lever 158, pivotally connected as at 164 to the upper end portion of arms 161, and to vertical arms 155 as at 165. The foot lever 152 may be pivoted, as at 166, to a bracket 167, secured to the rear wall 27 of the cabinet. Remote from pivot 166, the link 153 is pivoted to the lever, as at 168 and it extends vertically thru perforation 54 in bottom screen plate 31, with its upper end portion pivoted, as at 169 to the other end portion 170 of lever 158. The catch device 154 may be secured to the bottom wall 24 of the cabinet, as by rivets 171, a vertical arm 172 of the catch device having laterally projecting lugs 173 and 174 beneath which the foot lever may come to rest when the tank is either raised or lowered. The pivotal connection between foot lever 152 and bracket 167 is sufficiently loose to permit the foot lever being moved laterally, so as to disengage it from a position beneath lug 174 thereby permitting the tank and associated parts to be lowered, the foot lever 152 engaging beneath lug 173 to limit the downward movement of the scale and regulator. It is to be observed that the parallelogram mechanism 151 supports the scale in a manner that it is not likely to be injured even tho the extended stem section and poise 129 be subjected to considerable wind force. By making the cabinet of truncated pyramidal shape, there is ample room in the cabinet at the lower portion thereof, for the foot lever 152 and the catch device 154, laterally of the tank, as is very clear from an inspection of Figure 8.

When the filled tank is to be transported from the service station to the equipment, or an empty tank is to be taken to the service station in order to replenish the supply of liquefied petroleum gas at the consumer's premises, the tank may be conveniently carried on the running board K of a motor vehicle with the advantages as more fully set out in the aforesaid application, Serial Number 683,091. By operation of foot lever 152 the tank C may be lowered so that it rests upon the bottom wall 24 of the cabinet. The tank may then be disconnected from the pressure regulator 93 and associated parts by manipulation of wrench 75 which, thru wrench head 97 disconnects coupling member 96 from outlet coupling 82. The coupling 96 and wrench 75 may be lifted by again operating foot lever 152 so that it rests beneath lug 174. The tank C may then be rolled or carried to the vehicle for transportation purposes. Since in practice the consumer uses the family automobile for transportation of the tanks, little effort is required to lift the tank so that it rests longitudinally upon the running board.

The fastening devices L each preferably comprise a part 175 carried by the tank and a companion part 176 carried by the running board. At the service station, holes 177 may be drilled thru the running board open to the top and bottom thereof, these holes being spaced apart longitudinally of the running board a distance approximately the length of the tank. Thru each hole 177 the hollow cylindrical body portion 178 of an eyelet 179 may be placed, the flange 180 of the eyelet engaging the top surface of the running board. A nut 181 may have screw threaded engagement with the lower end portion of body 178 to secure the eyelet in place, a lock washer 182 being preferably interposed between the nut and the lower face of the running board. It is also preferred to provide notches 183 open to the lower margin of body 178 for a purpose to be subsequently set forth. The body portion 178 may be made sufficiently long that it may extend thru holes drilled in running boards of different thicknesses. It is to be understood, however, that this part 176 carried by the running board may be dispensed with. Its function is to give a neat finish to the altered running board, and to facilitate securing of the tank to the running board for transportation purposes, but is not essential to successful operation of the part 175, which will now be described. In order to keep the tank from rolling crosswise of the running board it is preferred to make the body 184 of each part 175 of substantially U-shape, comprising arms 185 and 186, and a bight portion 187 connecting the arms, and to pivot the latter as by pins 188 and 189 to lugs 190 and 191, respectively, the latter being welded or otherwise secured to the tank end in a manner that the body 184 may be swung to project outwardly from the tank as shown in Figures 19 and 20, or folded as shown in Figure 18. The bight portion 188 is preferably formed with two aligned flat portions 192 and a looped intermediate portion 193, provided with a perforation 194, which latter receives the shank 195 of a toggle bolt 196. The pivots 188 and 189 are so arranged that when the bodies 184 are swung to extend outwardly from the tank, the bight portions 187 are in a plane tangential to the circumferential periphery of the tank, as shown in Figure 20, so that the flat portions 192 have surface contact with the running board and effectively prevent the tank from rolling crosswise of the running board. If desired, a stop 197 may be associated with each arm 186 to limit swinging movement of the body 184, in one direction,—when it is in a plane crosswise the axis of the tank. The toggle bolt 196 is provided with a toggle 198, pivoted as at 199 to the lower portion of the bolt, and a wing nut 200 may have screw threaded engagement with shank 195 for the purpose of drawing the toggle 198 into firm engagement with the lower portion of the eyelet and for clamping body 184 to the running board as shown more clearly in Figure 21. The toggle 198 may be received in the notches 183 of the eyelet so as to prevent circumferential movement of the shank 195, as nut 200 is being turned tight. The nut 200 engages the looped portion 193 as shown in Figure 20. The upper end of shank 195 may be riveted over as indicated at 201 so as to prevent disconnection of the toggle bolt from the body 184.

Since it is undesirable to have the fastener part 175 free to swing when the tank is not mounted on the running board, the device M is provided at the bottom end of the tank for cooperation with the toggle bolt to prevent swinging movement. This device may comprise a bifurcated lug 203 having arms 204, with a slot 205 therebetween, the slot accommodating the shank 195, and the toggle 198 engaging the arms 204 with intimate contact as the nut 200 is rotated. As may be observed from Figure 20, the body 184 may be swung to a position extending thru slot 74 of foot ring 73.

The device N, disclosed more in detail in Figures 9 and 10 may be used to hold the other fastener part 175 in close relation to the cap G. It may comprise a shank 206 extending thru a perforation 207 in the cap, and provided at its outer end portion with a cross bar 208 having right angularly disposed lugs 209; a nut 210 on the other portion of shank 206; a coil spring 211 inside the cap engaging the wall 111 thereof; and a washer 212 interposed between the spring 211 and nut 210. One portion of the cross bar 208 may be grasped in order to compress the spring 211, while the other portion of the cross bar and its lugs 209 may engage fastener part 175 to hold it firmly against the cap G, as shown in Figure 18.

No great amount of effort or ingenuity is required on the part of the person when arranging the tank on the running board and securing same thereto. It is a simple matter to swing the fastener parts 175 to a position where the shank 195 of the toggle bolt 196 extends thru the eyelet of the running board, for of course the toggle 198 may be swung to a position where it extends longitudinally of the shank when placing same. After the toggle 198 is below the eyelet so that the upper end of the toggle clears the body portion 178, a little vibration of the toggle bolt will cause the toggle to swing to a position crosswise the axis of shank 195 and slight rotation of the shank will cause the toggle to engage in notches 183. Thereupon the wing nut 200 may be turned tight. When both fastening devices are in proper operative relation to the running board, the tank is firmly supported on the running board against both longitudinal and transverse movement.

After connecting the tank to the dispensing equipment on the consumer's premises, the scale may be brought into use to verify any claim that a filled tank has been furnished, since the word "Full" on the stem portion of the scale beam may be observed thru the sight openings 50 and 128 and the scale beam will balance when the indicator 130 points to the word "Full" if such is a fact. After such weighing operation, the operator may move the stem section of the scale beam so that the indicator points to such indicia on the stem section as desired, such as one representing "Empty" thus adapting the scale for signalling purposes. For instance, if so set, the poise 129 will descend when the major supply of liquefied petroleum gas in the tank C is depleted. If it is not desired to use the scale beam as a signal device, it may be adjusted so that the stem section is wholly within the cabinet, and the shutter 41 may be moved to a closed position. There need be no interruption of flow of low pressure gas to the gas consuming appliances during a weighing operation. A changeover from the major to the minor or reserve supply may be readily accomplished by manipulation of the valve stems 87 associated with valves 76 and 77. Because of the difficulty of removing the screen plates 30 and 31, unauthorized persons are not likely to tamper with parts in compartment 61.

While there are real advantages in making the cabinet of frusto-pyramidal shape; in offsetting the tank C in the cabinet, more toward one wall than the other; offsetting the control means D and the cap G more to one side of the longitudinal axis of the tank than to the other side thereof, and various minor details have been specifically referred to in the foregoing specification, it is to be understood that these may be varied without departing from the invention as set forth in the following claims.

I claim:

1. In customers' storage and gas utilization equipment, the combination of a closed elongated upright tank providing a plurality of separate compartments for separate supplies of high pressure liquefied petroleum gas, a consumer's service line for low pressure gas, a control means mounted upon the head of said tank including a separate valve for control of egress of fluid from each of said compartments, said control means offset on the tank head with respect to the longitudinal axis of the tank, so that the major portion of the mass of said means is to one side of said axis thereof leaving the portion of the tank head to the opposite side of said axis substantially free of accessories, and means for conducting fuel from the tank to said service line including a detachable coupling having an operating handle adjacent the head of the tank and movable in the space above the last mentioned portion of said tank head.

2. In customers' storage and gas utilization equipment, the combination of a tank for high pressure liquefied petroleum gas, a consumer's service line for low pressure gas, a pressure reducing regulator provided with a clevis-like portion having an upwardly opening mouth, means detachably coupling said regulator to said tank so that they may be moved as a unit and so that fluid from the tank may enter the regulator, a flexible conduit between the outlet of said regulator and said service line, and means for raising and lowering the tank and regulator, and including a portion extending into the mouth of said clevis-like portion and pivotally connected thereto.

3. In customers' storage and gas utilization equipment, the combination of a tank for high pressure liquefied petroleum gas, a consumer's service line for low pressure gas, a pressure reducing regulator provided with a clevis-like portion having an upwardly opening mouth, a detachable conduit coupling connecting said regulator to said tank so that they may be moved as a unit and so that fluid from the tank may enter the regulator, a flexible conduit between the outlet of said regulator and said service line, and means for raising and lowering the tank and regulator, and including a portion extending into the mouth of said clevis-like portion and pivotally connected thereto.

4. A liquefied gas tank comprising a body having a dome-shaped top wall and a bottom wall providing a chamber for liquefied gas, control devices for ingress and egress of gas to and from said chamber, mounted on said dome-shaped top wall, and a protecting cap circular in plan, mounted on said dome-shaped top wall about said control devices and eccentric to the vertical axis of said top wall, said cap provided with at least one drainage opening at its juncture with the top wall at the portion remote from said axis.

5. In consumer's storage and gas utilization equipment, the combination of an elongate upright cabinet including side walls and a front provided with an opening; an elongated upright closed tank for high pressure petroleum gas to be vaporized for use in a fuel consuming appliance and partitioned to provide a major compartment and a minor or reserve compartment for the liquefied gas, disposed in said cabinet; manually operable valves mounted upon said tank for separate control of the exit of fluid from said compartments, said valves mounted with their stems pointing in the direction of said cabinet opening; a vent valve for said minor compartment mounted upon said tank and including an operating member pointing toward one of said side walls of said cabinet, and a cap mounted upon said tank provided with two lateral openings thru which access may be had to said valve stems and a third lateral opening facing said last mentioned side wall of the cabinet, thru which access may be had to said vent valve operating member.

6. In dispensing equipment of the character described, the combination of a tank providing a major chamber and a minor chamber for liquefied gas, and a control assembly mounted upon said tank, including, manually operable valves next adjacent one another and the tank for controlling the exit of each of said chambers, an outlet coupling mounted vertically upon one of said manually operable valves with its mouth opening upwardly, a safety valve carried by said last mentioned manually operable valve and extending laterally, diagonally and upwardly therefrom, said safety valve in operative communication with the chamber of the manually operable valve which carries it, and a conduit in a plane below the upper portion of said last mentioned safety valve and affording communication between the outlets of said manually operable valves, whereby said outlet coupling serves both of said manually operable valves.

7. In consumers' storage and gas utilization equipment, the combination of an elongated upright cabinet body, polygonal in cross section and having an open front, an elongated upright tank having a chamber for high pressure liquefied gas disposed with at least its upper portion in said cabinet body, means mounted on the upper portion of said tank for control of the exit of fluid from said tank, a consumer's conduit line for low pressure gas extending into said cabinet body, a pressure reducing regulator and scale in and supported by the upper portion of the cabinet body connected to said tank, said regulator having operative communication with said chamber and conduit line, and said scale including an indicator, and an upright screen wall in the cabinet body extending crosswise in front of said scale and regulator, secured to opposite walls of the cabinet to brace the same, and provided with a sight opening thru which said scale indicator may be viewed.

8. In consumer's storage and gas utilization equipment, the combination of an elongated upright cabinet body including opposite side walls, a back wall and a top, said cabinet body being open at its front, an elongated upright tank having a chamber for high pressure liquefied gas disposed with at least its upper portion in said cabinet body, means mounted on the upper portion of said tank for control of the exit of fluid from said tank, a consumer's conduit line for low pressure gas extending into said cabinet body, a pressure reducing regulator and a scale in and supported by the upper portion of the cabinet body connected to said tank, said regulator having operative communication with said chamber and conduit line, and said scale including an indicator, an upright screen wall in the cabinet body extending in front of said scale and regulator and provided with a sight opening thru which said scale and indicator may be viewed, and a horizontal screen wall in the cabinet body extending below said scale and regulator and provided with an opening for the connection between the tank and regulator, said upright and horizontal screen walls secured to the side walls of the cabinet body and said horizontal screen wall secured to said front screen wall and the back wall to brace the cabinet body.

9. In consumer's storage and gas utilization equipment, the combination of an elongated upright cabinet body including opposite side walls, a back wall, and an open front, an elongated upright tank having a chamber for high pressure liquefied gas disposed with at least its upper portion in said cabinet body, means mounted on the upper portion of said tank for control of the exit of fluid from said tank, a consumer's conduit line for low pressure gas extending into said cabinet body, a pressure reducing regulator in the upper portion of said cabinet body, a high pressure conduit and a detachable coupling between said tank and the inlet of the regulator, a flexible low pressure conduit between the conduit line and the outlet of the regulator, means for pendently supporting the regulator and tank from the upper portion of the cabinet, and a horizontal screen wall detachably secured to said cabinet body and extending forwardly from the rear wall toward the open front thereof and from side wall to side wall of the cabinet body to brace the same, said screen wall below said regulator and flexible conduit and above the tank, said screen wall provided with an elongated slot open to the rear margin thereof and having a closed end near the front margin thereof to accommodate said high pressure conduit and limit outward swinging movement of the tank and regulator.

10. In consumer's storage and gas utilization equipment, the combination of an elongated upright cabinet body including opposite side walls, a back wall and a top wall, said cabinet body being open at its front and one of its side walls provided with a scale beam opening near its upper margin, an elongated upright tank for high pressure liquefied gas disposed with at least its upper portion in said cabinet body, a consumer's conduit line for low pressure gas extending into said cabinet body, a pressure reducing regulator and a scale in the upper portion of said cabinet body, said regulator having operative communication with said tank and conduit line, and said scale including a slidable beam movable to a position extending outwardly thru the said opening in said cabinet body wall and to another position, entirely in the cabinet body, means in the cabinet body for pendently supporting the scale, regulator and tank from the upper portion of the cabinet, an upright screen wall in the cabinet body extending in front of said scale and regulator, a horizontal screen wall in the cabinet body below said scale and regulator, said screen wall secured to said cabinet body side walls and top and rear walls to brace and form a compartment in the upper portion of the cabinet open laterally of the cabinet wall at said scale beam opening, and a shutter for said scale beam opening.

11. In customers' storage and gas utilization equipment, the combination of an elongated upright cabinet including side walls, a top and a bottom, an elongated upright tank for the fuel, offset in the cabinet so as to be nearest one of the side walls, a rigid service line rigidly connected to and extending from the cabinet, means for conducting fuel from the tank to the service line including a flexible conduit for conducting the fuel and permitting the tank to be raised and lowered without disrupting the flow of fuel to the service line, and means in the cabinet for raising and lowering said tank while in fuel conducting relation with said service line including mechanism supported by the cabinet near the top thereof movable toward and from the cabinet top and operatively connected to the upper portion of the tank for simultaneous movement with said mechanism, a foot pedal adjacent the bottom of the cabinet, and a link between the foot pedal and mechanism extending longitudinally of the cabinet adjacent the other of said side walls thereof whereby movement of the foot pedal is transmitted to said mechanism at the top of the cabinet.

PAUL S. ENDACOTT.